(12) United States Patent
Crabtree et al.

(10) Patent No.: US 12,483,599 B2
(45) Date of Patent: Nov. 25, 2025

(54) REGULATION-BASED ELECTRONIC MESSAGE ROUTING

(71) Applicant: QOMPLX LLC, Reston, VA (US)

(72) Inventors: Jason Crabtree, Vienna, VA (US); Andrew Sellers, Monument, CO (US); John Uchiyama, Herndon, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/434,761

(22) Filed: Feb. 6, 2024

(65) Prior Publication Data

US 2024/0348655 A1 Oct. 17, 2024

Related U.S. Application Data

(63) Continuation of application No. 17/106,997, filed on Nov. 30, 2020, now Pat. No. 11,979,433, which is a continuation-in-part of application No. 15/931,534, filed on May 13, 2020, now abandoned, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, (Continued)

(51) Int. Cl.
G06F 16/2458 (2019.01)
G06F 16/951 (2019.01)
H04L 9/40 (2022.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1441; G06F 16/9024; G06F 16/2477
See application file for complete search history.

(56) References Cited

U.S. PATENT DOCUMENTS 5,669,000 A 9/1997 Jessen et al.
6,003,084 A * 12/1999 Green ................... H04L 67/14
709/227

(Continued)

FOREIGN PATENT DOCUMENTS

| WO | 2001063534 A2 | 8/2001 |
| WO | 2014159150 A1 | 10/2014 |
| WO | 2017075543 A1 | 5/2017 |

OTHER PUBLICATIONS

Matthiaslohr, Provide a method Peer.close( ), Mar. 27, 2013.
Microsoft; What's new in Kerberos Authentication, Aug. 31, 2016.

*Primary Examiner* — Kris E Mackes
(74) *Attorney, Agent, or Firm* — Galvin Patent Law LLC; Brian R. Galvin

(57) ABSTRACT

A system for regulation-based electronic message routing using an expanded open system interconnection ("OSI") model. Information regulations and information policy rules comprise three additional layers beyond the standard seven-layer OSI model from a data store. Electronic messages are routed using a handling policy rule generator to validate destination, storage, and transport.

11 Claims, 13 Drawing Sheets

Related U.S. Application Data now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, said application No. 15/931,534 is a continuation-in-part of application No. 15/683,765, filed on Aug. 22, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, said application No. 15/931,534 is a continuation-in-part of application No. 16/718,906, filed on Dec. 18, 2019, now Pat. No. 11,055,140, which is a continuation of application No. 15/879,182, filed on Jan. 24, 2018, now Pat. No. 10,514,954, which is a continuation-in-part of application No. 15/850,037, filed on Dec. 21, 2017, now abandoned, which is a continuation-in-part of application No. 15/673,368, filed on Aug. 9, 2017, now abandoned, which is a continuation-in-part of application No. 15/376,657, filed on Dec. 13, 2016, now Pat. No. 10,402,906, said application No. 16/718,906 is a continuation of application No. 15/879,182, filed on Jan. 24, 2018, now Pat. No. 10,514,954, which is a continuation-in-part of application No. 15/850,037, filed on Dec. 21, 2017, now abandoned, which is a continuation-in-part of application No. 15/489,716, filed on Apr. 17, 2017, now abandoned, which is a continuation-in-part of application No. 15/409,510, filed on Jan. 18, 2017, now abandoned, said application No. 15/931,534 is a continuation-in-part of application No. 15/905,041, filed on Feb. 26, 2018, now Pat. No. 10,706,063, which is a continuation-in-part of application No. 15/237,625, filed on Aug. 15, 2016, now Pat. No. 10,248,910, said application No. 15/931,534 is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/931,534 is a continuation-in-part of application No. 16/654,309, filed on Oct. 16, 2019, now abandoned, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 15/847,443 is a continuation-in-part of application No. 15/616,427, filed on Jun. 7, 2017, now abandoned, and a continuation-in-part of application No. 15/489,716, filed on Apr. 17, 2017, now abandoned, said application No. 15/931,534 is a continuation-in-part of application No. 16/660,727, filed on Oct. 22, 2019, now Pat. No. 10,938,683, which is a continuation of application No. 15/229,476, filed on Aug. 5, 2016, now Pat. No. 10,454,791, which is a continuation-in-part of application No. 15/206,195, filed on Jul. 8, 2016, now abandoned, said application No. 15/616,427 is a continuation-in-part of application No. 14/925,974, filed on Oct. 28, 2015, now abandoned, said application No. 15/376,657 is a continuation-in-part of application No. 15/237,625, filed on Aug. 15, 2016, now Pat. No. 10,248,910, said application No. 15/379,899 is a continuation-in-part of application No. 15/376,657, filed on Dec. 13, 2016, now Pat. No. 10,402,906.

(60) Provisional application No. 62/568,298, filed on Oct. 4, 2017, provisional application No. 62/568,291, filed on Oct. 4, 2017.

(56) References Cited

U.S. PATENT DOCUMENTS

| | | |
|---|---|---|
| 6,256,544 B1 | 7/2001 | Weissinger |
| 6,477,572 B1 | 11/2002 | Elderton et al. |
| 7,072,863 B1 | 7/2006 | Phillips et al. |
| 7,171,515 B2 | 1/2007 | Ohta et al. |
| 7,530,105 B2 | 5/2009 | Gilbert et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,180,854 B2 | 5/2012 | Schneider |
| 8,281,121 B2 | 10/2012 | Nath et al. |
| 8,615,800 B2 | 12/2013 | Baddour et al. |
| 8,677,473 B2 | 3/2014 | Dennerline et al. |
| 8,788,254 B2 | 7/2014 | Peloski |
| 8,788,306 B2 | 7/2014 | Delurgio et al. |
| 8,793,758 B2 | 7/2014 | Raleigh et al. |
| 8,856,936 B2 | 10/2014 | Ray et al. |
| 8,914,878 B2 | 12/2014 | Burns et al. |
| 8,990,392 B1 | 3/2015 | Stamos |
| 8,997,233 B2 | 3/2015 | Green et al. |
| 9,020,802 B1 | 4/2015 | Florissi et al. |
| 9,092,616 B2 | 7/2015 | Kumar et al. |
| 9,122,694 B1 | 9/2015 | Dukes et al. |
| 9,134,966 B2 | 9/2015 | Brock et al. |
| 9,137,131 B1 | 9/2015 | Sarukkai et al. |
| 9,141,360 B1 | 9/2015 | Chen et al. |
| 9,191,365 B2 * | 11/2015 | Orr ..................... H04L 63/08 |
| 9,231,962 B1 | 1/2016 | Yen et al. |
| 9,299,029 B1 | 3/2016 | Kim |
| 9,319,430 B2 | 4/2016 | Bell, Jr. et al. |
| 9,350,550 B2 | 5/2016 | Nix |

(56) References Cited

U.S. PATENT DOCUMENTS

| | | |
|---|---|---|
| 9,357,381 B2 | 5/2016 | Cho et al. |
| 9,384,345 B2 | 7/2016 | Dixon et al. |
| 9,426,118 B2 | 8/2016 | Kim |
| 9,451,462 B2 | 9/2016 | Kim et al. |
| 9,503,470 B2 | 11/2016 | Gertner et al. |
| 9,571,510 B1 | 2/2017 | Shen et al. |
| 9,602,530 B2 | 3/2017 | Ellis et al. |
| 9,654,495 B2 | 5/2017 | Hubbard et al. |
| 9,654,503 B1* | 5/2017 | Kowalyshyn ....... H04L 63/1425 |
| 9,672,355 B2 | 6/2017 | Titonis et al. |
| 9,686,308 B1 | 6/2017 | Srivastava |
| 9,760,840 B1* | 9/2017 | Tyagi ............... G06Q 10/06313 |
| 9,762,443 B2 | 9/2017 | Dickey |
| 9,887,933 B2 | 2/2018 | Lawrence, III |
| 9,946,517 B2 | 4/2018 | Talby et al. |
| 9,967,334 B2 | 5/2018 | Ford |
| 10,061,635 B2 | 8/2018 | Ellwein |
| 10,200,233 B2 | 2/2019 | Anderson et al. |
| 10,210,246 B2 | 2/2019 | Stojanovic et al. |
| 10,210,255 B2 | 2/2019 | Crabtree et al. |
| 10,216,485 B2 | 2/2019 | Misra et al. |
| 10,242,406 B2 | 3/2019 | Kumar et al. |
| 10,248,910 B2 | 4/2019 | Crabtree et al. |
| 10,262,321 B1 | 4/2019 | Ramanathan et al. |
| 10,318,882 B2 | 6/2019 | Brueckner et al. |
| 10,320,828 B1 | 6/2019 | Derbeko et al. |
| 10,367,829 B2 | 7/2019 | Huang et al. |
| 10,511,498 B1 | 12/2019 | Narayan et al. |
| 10,831,838 B2 | 11/2020 | Kraning et al. |
| 11,017,096 B2 | 5/2021 | Tsokos et al. |
| 2002/0093973 A1* | 7/2002 | Tzeng .................. H04L 49/606 |
| | | 370/369 |
| 2003/0115080 A1 | 6/2003 | Kasravi et al. |
| 2004/0010491 A1 | 1/2004 | Riedinger |
| 2004/0255167 A1 | 12/2004 | Knight |
| 2005/0000165 A1 | 1/2005 | Dischinat et al. |
| 2005/0289072 A1 | 12/2005 | Sabharwal |
| 2006/0100958 A1 | 5/2006 | Cheng et al. |
| 2006/0149575 A1 | 7/2006 | Varadarajan et al. |
| 2007/0012161 A1 | 1/2007 | Lyles |
| 2007/0021955 A1 | 1/2007 | Tolone et al. |
| 2007/0043656 A1 | 2/2007 | Lancaster |
| 2007/0226796 A1 | 9/2007 | Gilbert et al. |
| 2008/0027690 A1 | 1/2008 | Watts |
| 2008/0069082 A1* | 3/2008 | Patrick ................... H04L 45/22 |
| | | 370/351 |
| 2008/0091757 A1 | 4/2008 | Ingrassia et al. |
| 2008/0172353 A1 | 7/2008 | Lim et al. |
| 2009/0018996 A1 | 1/2009 | Hunt et al. |
| 2009/0064088 A1 | 3/2009 | Barcia et al. |
| 2009/0089227 A1 | 4/2009 | Sturrock et al. |
| 2009/0222562 A1 | 9/2009 | Liu et al. |
| 2009/0293128 A1 | 11/2009 | Lippmann et al. |
| 2010/0042846 A1 | 2/2010 | Trotter et al. |
| 2010/0180337 A1 | 7/2010 | Bajekal |
| 2010/0185579 A1 | 7/2010 | Hong et al. |
| 2010/0205588 A1 | 8/2010 | Yu et al. |
| 2010/0228693 A1 | 9/2010 | Dawson et al. |
| 2011/0054860 A1 | 3/2011 | Guild et al. |
| 2011/0060821 A1 | 3/2011 | Loizeaux et al. |
| 2011/0154341 A1 | 6/2011 | Pueyo et al. |
| 2011/0208681 A1 | 8/2011 | Kuecuekyan |
| 2012/0030757 A1 | 2/2012 | Baikalov et al. |
| 2012/0266244 A1 | 10/2012 | Green et al. |
| 2012/0303396 A1 | 11/2012 | Winkler et al. |
| 2013/0041921 A1 | 2/2013 | Cooper et al. |
| 2013/0073062 A1 | 3/2013 | Smith et al. |
| 2013/0073686 A1 | 3/2013 | Sandholm |
| 2013/0111592 A1 | 5/2013 | Zhu et al. |
| 2013/0117852 A1 | 5/2013 | Stute |
| 2013/0132149 A1 | 5/2013 | Wei et al. |
| 2013/0179982 A1 | 7/2013 | Bridges et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2013/0346354 A1 | 12/2013 | Mizell et al. |
| 2014/0074826 A1 | 3/2014 | Cooper et al. |
| 2014/0156806 A1 | 6/2014 | Karpistsenko et al. |
| 2014/0201221 A1 | 7/2014 | Eden et al. |
| 2014/0237599 A1 | 8/2014 | Gertner et al. |
| 2014/0244612 A1 | 8/2014 | Bhasin et al. |
| 2014/0245443 A1 | 8/2014 | Chakraborty |
| 2014/0274022 A1 | 9/2014 | Bell et al. |
| 2014/0279762 A1 | 9/2014 | Xaypanya et al. |
| 2014/0358911 A1 | 12/2014 | McCarthy et al. |
| 2014/0359552 A1 | 12/2014 | Misra et al. |
| 2014/0365938 A1 | 12/2014 | Black et al. |
| 2015/0020199 A1 | 1/2015 | Neil et al. |
| 2015/0095303 A1 | 4/2015 | Sonmez et al. |
| 2015/0106941 A1 | 4/2015 | Muller et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0186427 A1 | 7/2015 | Logothetis et al. |
| 2015/0195192 A1 | 7/2015 | Vasseur et al. |
| 2015/0207806 A1* | 7/2015 | Be'Ery .................. H04L 63/30 |
| | | 726/23 |
| 2015/0236935 A1 | 8/2015 | Bassett |
| 2015/0339263 A1 | 11/2015 | Ata et al. |
| 2015/0347414 A1 | 12/2015 | Xiao et al. |
| 2015/0370811 A1 | 12/2015 | Ding et al. |
| 2015/0371224 A1 | 12/2015 | Lingappa |
| 2015/0379072 A1 | 12/2015 | Dirac et al. |
| 2015/0379424 A1 | 12/2015 | Dirac et al. |
| 2016/0004858 A1 | 1/2016 | Chen et al. |
| 2016/0006629 A1 | 1/2016 | Ianakiev et al. |
| 2016/0028758 A1 | 1/2016 | Ellis et al. |
| 2016/0078361 A1 | 3/2016 | Brueckner et al. |
| 2016/0080399 A1 | 3/2016 | Harris et al. |
| 2016/0092557 A1 | 3/2016 | Stojanovic et al. |
| 2016/0099960 A1 | 4/2016 | Gerritz et al. |
| 2016/0105454 A1 | 4/2016 | Li et al. |
| 2016/0140446 A1 | 5/2016 | Adderly et al. |
| 2016/0140519 A1 | 5/2016 | Trepca et al. |
| 2016/0164905 A1 | 6/2016 | Wood et al. |
| 2016/0179945 A1 | 6/2016 | Lastra Diaz et al. |
| 2016/0203448 A1 | 7/2016 | Metnick et al. |
| 2016/0241580 A1 | 8/2016 | Watters et al. |
| 2016/0241581 A1 | 8/2016 | Watters et al. |
| 2016/0254985 A1* | 9/2016 | Judge .................... H04L 45/58 |
| | | 370/389 |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0322959 A1 | 11/2017 | Tidwell et al. |
| 2017/0323089 A1 | 11/2017 | Duggal et al. |
| 2018/0144243 A1 | 5/2018 | Hsieh et al. |
| 2018/0197128 A1 | 7/2018 | Carstens et al. |
| 2018/0288085 A1 | 10/2018 | Hailpern et al. |
| 2018/0300930 A1 | 10/2018 | Kennedy et al. |
| 2019/0082305 A1 | 3/2019 | Proctor |
| 2019/0095533 A1 | 3/2019 | Levine et al. |
| 2019/0109713 A1* | 4/2019 | Clark .................... G06F 16/182 |

* cited by examiner

| 301 Layer | 302 Function |
|---|---|
| 3. Network 313a | Management of a multi-node network including addressing, packet routing and traffic control protocols. 313b |
| 2. Data Link 312a | Reliable transmissions of data frames between two endpoints connected by physical level devices. 312b |
| 1. Physical 311a | Transmission and reception of information containing impulses over a physical hardware medium. 311b |

Media Layers 310

Fig. 3A

| 301 | Layer | 302 | Function |
|---|---|---|---|
| | 7. Application 324a | | High level networked solutions such as remote resource sharing, networked application service sharing protocols and other APIs for networked processes. 324b |
| | 6. Presentation 323a | | Translation of data between a form for network transmission and a form useful to one or more applications; including data decompression, and data decryption. 323b |
| | 5. Session 322a | | Management of communication sessions in the form of back and forth transmission of information between two nodes on a network. 322b |
| | 4. Transport 321a | | Reliable transmission of data segments or datagrams between points on a network including connection, initiation, segment acknowledgement and re-transmit. 321b |
| Host Layers 320 | | | |

| 301 Layer | 302 Function |
|---|---|
| 10. Government 333a | Manage message payload parameters relating to governments, countries, regions, zones, ex. whether the area is allowed to send or receive a specific payload. Keep the area's directives. 333b |
| 9. Organization 332a | Manage message payload parameters relating to organizations, ex. whether the organization is allowed to send or receive a specific payload. Hold organization's directives. 332b |
| 8. Individual 331a | Manage message payload parameters relating to individuals, such as whether the individual is allowed to send or receive a specific payload. Hold individual's attributes. 331b |

Payload Layers 330

Sample MSL Compliant Message Header 510 sourceKey: US.ABC1234MHOSP.NKEANMD activePolicies: HIPAA
payloadKey: PRECORD.TRANSFER.STDOUT US
receiverKey: US.WXYZ4321MHOSP.JWILSONMD transCRYPTO

Example Programming 550

MLS Addresser Module
```
.onSourceKey("US.ABC1234MHOSP.NKEANMD")
.onPayloadkey("PRECORD.TRANSFER.STDOUT")
.addReceiverKey("US.WXYZ4321MHOSP.JWILSONMD")
.send()
```
551
```
Exchange("Source")
.bind("US.ABC1234MHOSP.*")
.to("SourceRouter")
```
552
Source Router
```
.of("US.ABC1234MHOSP.*")
.if("patient-health-record")
.not()
.then()
.forward
```

553
```
Exchange("Payload")
.bind("PRECORD.TRANSFER.STDOUT")
.to("PayLoadRouter")
```

Fig. 5A

Sample MSL Compliant Message Header sourceKey: US.ABC1234MHOSP.NKEANMD
payloadKey: PRECORD.TRANSFER.STDOUT
receiverKey: US.WXYZ4321MHOSP.JWILSONMD
activePolicies: HIPAA, US, transCRYPTO

*510*

Example Programming

Payload Router
```
.of("PRECORD.TRANSFER.STDOUT")
.if(policy.is("US"))
.not()
.then
.forward()
```
*554*

Payload Router
```
.cont("PRECORD.TRANSFER.STDOUT")
.if(policy.is("HIPAA"))
.not()
.then
.forward()
```
*555*

Receiver Router
```
.of("US.WXYZ4321MHOSP.*")
.if(receiveind.is.policyTrusted(JWILSONMD))
.then
.forward()
```
*557*

```
exchange("Receiver")
.bind("US.WXYZ4321MHOSP.*")
.to("ReceiverRouter")
```
*556*

REGULATION-BASED ELECTRONIC MESSAGE ROUTING

CROSS-REFERENCE TO RELATED APPLICATIONS

Priority is claimed in the application data sheet to the following patents or patent applications, each of which is expressly incorporated herein by reference in its entirety:
Ser. No. 17/106,997
Ser. No. 15/931,534
Ser. No. 16/777,270
Ser. No. 16/720,383
Ser. No. 15/823,363
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 15/683,765
Ser. No. 15/409,510
Ser. No. 15/379,899
Ser. No. 15/376,657
Ser. No. 16/718,906
Ser. No. 15/879,182
Ser. No. 15/850,037
Ser. No. 15/673,368
Ser. No. 15/489,716
Ser. No. 15/905,041
Ser. No. 16/191,054
Ser. No. 16/654,309
Ser. No. 15/847,443
Ser. No. 15/790,457
Ser. No. 62/568,298
Ser. No. 15/790,327
Ser. No. 62/568,291
Ser. No. 15/616,427
Ser. No. 16/660,727
Ser. No. 15/229,476

BACKGROUND OF THE INVENTION

Field of the Invention

The present invention is in the field of routing electronic messages over wide area networks possibly including the Internet. Specifically, the use of a system of routers that employ labels encapsulated in a message's individual, organization and government OSI model layer headers to establish message payload-level availability zones.

Discussion of the State of the Art

The legal, regulatory, and cultural expectations of data aggregation and processing oriented practices are growing increasingly complex. Unfortunately, due to this complexity, technology companies are failing to comply with governments despite the expenditure of costly amounts of workforce effort and budget capital. The current continuing spiral is now serving to increasingly erode the public's trust. Global cloud providers (e.g. AWS) address these pressures by creating regional datacenters and availability zones inside countries or homogenous regulatory environments to support emerging regulations and requirements. As governments continue to enforce their sovereign rights and as case law evolves, the compounding effects of legislation, sensitive information exposure and increasing legal exposure resulting from network exploits accelerates. These events assure that all will continue to see strong balkanization of the once homogenous technology infrastructure.

The proliferation of parochial rules, regulations, and obligations of companies destroys the "write once and run anywhere" business model and economics of modern Internet "cloud-based" applications. This accelerating trend requires new approaches to managing the responsibilities of owning, moving and analyzing data to remain performant, economically feasible, and compliant. Organizations no longer may only adhere to internal business logic and industry specific regulations, but they must also incorporate technology company business logic. As there exists no border customs to check exported goods. What is needed is a highly secure service system that continuously tracks current world government regulations, may be easily programmed to incorporate organization best practices and business policies and then will automatically handle network traffic routing such that all regulations based on individual network message payload are fulfilled at all stages of transmission and compliance is recorded for possible later forensic or regulatory analysis.

SUMMARY OF THE INVENTION

Accordingly, the inventor has developed a system for regulation-based switching system for electronic message routing. In a typical embodiment, network bound messages with sensitive information containing payloads are received with information regulation identifying and information policy identifying labels in addition to source router identifying label all of which may correspond to OSI model layer 8, 9 and 10 corresponding information in the form of "<GOVERNMENT>.<ORGANIZATION>. <INDIVIDUAL>" for routing functions and "<CLASS>.<METHOD>.<STREAM>" for payload characteristics although other configurations may be used systemically as needed. Regulation compliance pertaining to payload contents at all stages of both transmission and receiving entity information delivery is controlled by up-to-date software rules entered into a highly secure, ledger bound, regulation and policy data store. During transmission, both source and receiver specific for all applicable regulation and policy rules of the current message payload may control delivery path of the regulated message and the suitability of the intended recipient entity using additional recipient entity credential data local to the message destination systems. All stages of payload analysis, label application, transmission and delivery to the recipient entity of each service system handled payload may be logged for subsequent forensic or regulatory compliance analysis.

According to a preferred embodiment of the invention, a system for regulation-based electronic message routing comprising: an access tightly regulated data store stored in a memory of and operating on a processor of a computing device and configured for the entry and management of information regulation and information policy rules. Further present, an information regulation and information policy aware message payload level routing module stored in a memory of and operating on a processor of a computing device and configured to: retrieve all current information regulation and information policy information rules programming from the access tightly regulated data store; receive network bound messages addressed to a specific receiving entity from at least one message payload aware messaging client; apply all regulatory and policy based rule programming based upon payload content from each network bound message; confirm that the sender of the network bound message and information payload of the network bound message comply with all regulatory and policy based rule programming to be transmitted to the receiver; activate a network bound message rule compliant source router stored in a memory of and operating on a processor of a computing device and configured to send the network bound message to a receiver router at the specific receiving entity, the source router pre-programmed to choose a path of router hops compliant to all current information regulation and information policy information rules; activate a network bound message rule compliant receiver router stored in a memory of and operating on a processor of a computing device and configured to receive an incoming network message from a source router at the specific receiving entity, the receiver router pre-programmed to confirm that the receiving entity complies with all current information regulation and information policy rules prior to ultimate delivery.

According to another embodiment of the invention, a system for regulation-based electronic message routing has been developed wherein at least one of the access tightly regulated data stores includes a ledger feature to immutably record changes made to access the tightly regulated data store, wherein at least a plurality of information regulations is issued by at least one government entity from at least one geographical region, wherein at least a plurality of information policies is issued by at least one organization from at least one geographical region.

According to a preferred embodiment of the invention, a method for regulation-based electronic message routing comprising the steps of: retrieving current information handling regulation-based rules programming and current information handling policy based rules programming from an access tightly regulated data store stored in a memory of and operating on a processor of a computing device using an information regulation and information policy aware message payload level routing module stored in a memory of and operating on a processor of a computing device; receiving network bound messages addressed to a specific receiving entity from at least one message payload aware messaging client using the information regulation and information policy aware message payload level routing module; applying all regulatory and policy based rule programming based upon payload content from each network bound message using the information regulation and information policy aware message payload level routing module; activating a network bound message rule compliant source router stored in a memory of and operating on a processor of a computing device and configured to send the network bound message to a receiver router at the specific receiving entity, the source router pre-programmed to choose a path of router hops compliant to all current information regulation and information policy information rules using the information regulation and information policy aware message payload level routing module; and activating a network bound message rule compliant receiver router stored in a memory of and operating on a processor of a computing device and configured to receive an incoming network message from a source router at the specific receiving entity, the receiver router pre-programmed to confirm that the receiving entity complies with all current information regulation and information policy rules prior to ultimate delivery using the information regulation and information policy aware message payload level routing module.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 3A, FIG. 3B and FIG. 3C are diagrams showing various layers of an exemplary representation of the ten-layer OSI model.

FIG. 5A and FIG. 5B are process diagrams of a simplified OSI 8/9/10 message header and example programming structure per an embodiment.

DETAILED DESCRIPTION OF THE INVENTION

Figure 1:
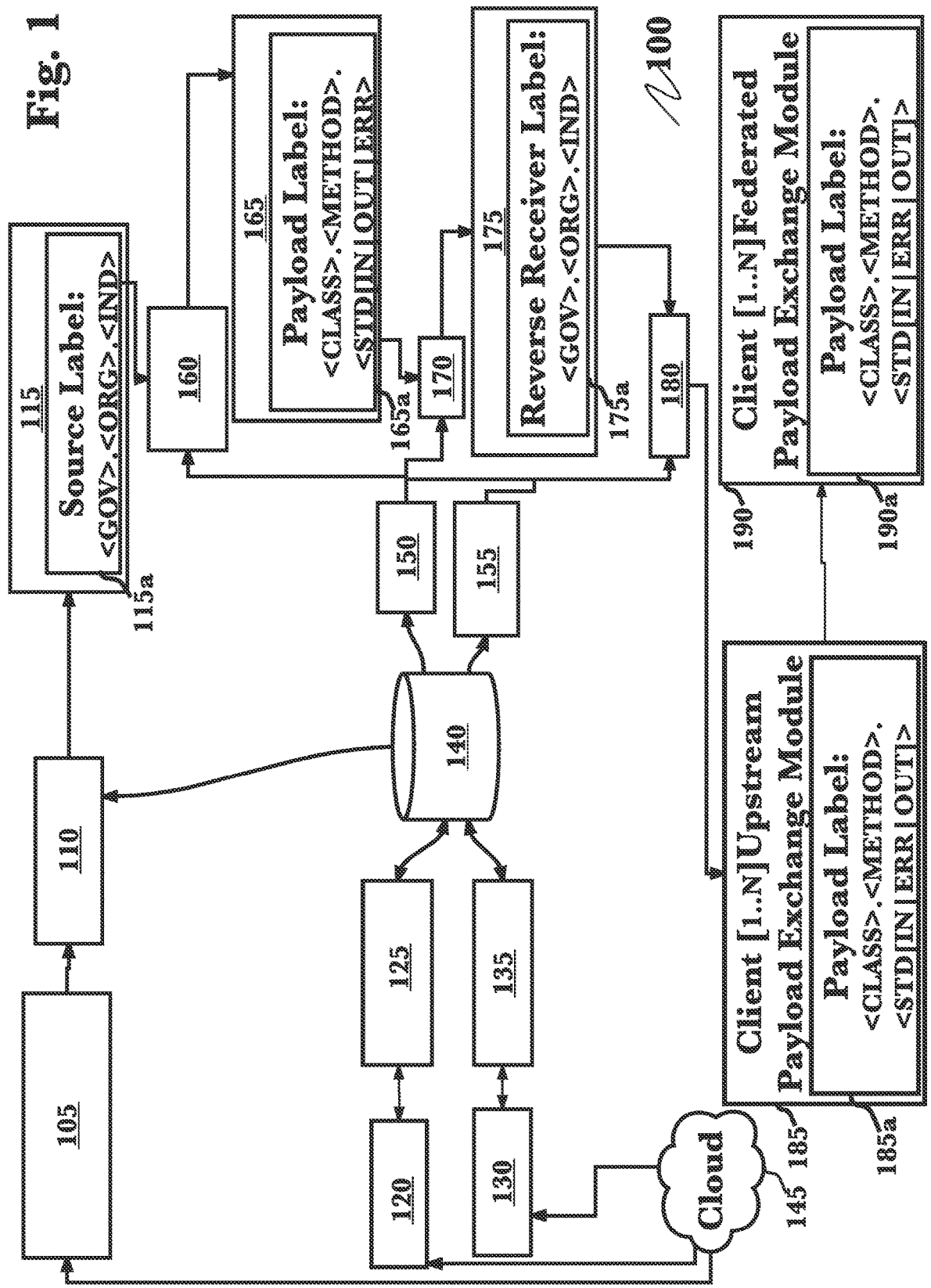
FIG. 1 is a diagram of an exemplary architecture of a regulatory message label-aware message routing system per an embodiment.

The inventor has conceived, and reduced to practice, a system for regulation-based electronic message routing.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a regulatory label-aware electronic message routing system 100 per an embodiment. The embodiment works to simplify the exchange of messages containing sensitive and regulation-controlled information by allowing routing boundaries, rules, policies and router handling programming for each to be centrally entered and then dictate message flow for the entire controlled WAN. The messages may enter the embodiment from external sources through a message label switch (MLS) aware messaging client 105 which is so named as it may set up routing paths based upon payload content dictated labels. The labels may contain policy and regulatory information pertaining to an individual, and pertaining to similar information connected to entities at an organization or government level. These messages may arrive at the messaging client already possessing a label designation for the source router, which may be software based, to be employed to send it, one or more labels disclosing the payload and thus designating the payload router, which again may be software based, to be targeted and a destination location indication of where the author requests the message sent 105. Designation of formal destination or "receiver" MLS aware router may be made by an MLS addresser module 110 which selects a receiver router for the message at least partially based upon the current rule, policy and regulation entries stored in a MLS rules write ahead data store 140. Once addressed with a receiving router, the message, now with its source router, payload router and receiver router designated, will pass to the source exchange module 115 which may serve as a message aggregator for the specified MLS source router 160. The source router, which may be software based may be implemented and configured upon arrival of a message payload requiring specific regulatory of policy dictated capabilities. Also shown is an MLS type source label which indicates an individual (IND), organization (ORG) and government (GOV) labeling structure 115a where information about the sender, the sender's organization and the sender's country or geographical zone may be disclosed. For example, "US.ABC1234MHOSP.NKEANMD" may identify Dr. Noa Kean at ABC1234 Memorial Hospital in the US. Each portion of this label may invoke pre-engineered programming rules within the regulatory label-aware message routing system that effect the payloads that may be sent, who may send the payload and the receivers to which they may be transmitted. At this stage in the process a pre-programmed rule such as but not limited to whether NKEANMD may send messages from the source router may be exercised. If this example rule, together with other possible source router rules are passed, the message may be bound to the source router 160. A next process to occur prior to transmission of the message may be the analysis of the payload label plus any other policy markers that may accompany the message header in preferred aspects, in a payload exchange module 165. The payload label may be of the form "payload class"<CLASS>, "payload method"<METHOD>, and "payload origin"<STDIN|OUT|ERR> 165*a*. This label, like that for binding the source router, invokes pre-engineered programming pertaining to the characteristics of the payload contained in the message as disclosed by the payload label and in at least some instances, additional policy markers attached to the message possibly in a header stack. One of a great plurality of examples may be payload containing a HIPAA regulated patient record possessing a "PRECORD.TRANSFER.STDOUT" label. Some pre-programmed rules that may be applied are whether the sending individual, Dr. Kean in our example, may legally access and send the payload. A failure to pass this test or other tests, individually or in combination (where the 'AND' conjunctive is implicitly in effect by default but 'OR' disjunctive may also be used) may stop the transaction. Another rule may address whether ABC1234 Memorial Hospital may send the HIPAA regulated payload to the intended recipient and a last pre-programmed rule may determine whether the recipient has the credentials to receive the HIPAA protected payload. If all payload routing rules and policies are met, the message will be bound to the payload router 170, which may be implemented and configured on-the-fly and the message may then be transmitted to the receiver exchange module 175 which serves as an aggregator for incoming messages to that router using a more global reverse receiver message, which while it has the general form of <GOV>.<ORG>.<IND> may use a more generic form of the label where the individual recipient is programmatically substituted with a generic, all inclusive, identifier (*).

The transfer to the receiver router, more than others, may involve the transmission of the message from one regulatory label-aware message routing system, which itself may be highly distributed to another distributed regulatory label-aware message routing system, possibly requiring a plurality of intermediary hops. Due to the use of message layer routing (OSI 7/8) instead of packet layer routing (OSI 3) and a networking protocol, multi-protocol label switching (MPLS), which, among a plurality of other capabilities, may allow an edge router, which the source router may be considered an example, to specify the router for the next hop in the path to the ultimate destination as well as possibly designating the ultimate destination router. At each intermediate router along the pathway the current router may strip its designation from the list and add that of the chosen next hop router in its place. An extension of MPLS may also allow labels constraining the travel of the routed message to routers with specific capabilities, possibly security protocols or message integrity related, or geographical zones, for instance only within the US, to be placed on the label stack such that only network routers with those characteristics may be used. This feature of adding policy labels may allow individuals, organizations and governments using regulatory label-aware message routing system services to easily ensure that their network messages fulfill all necessary data transfer laws and regulations.

While <GOV>.<ORG>.<IND> 115*a* and <CLASS>.<METHOD>.<STDIN|OUT|ERR> 165*a* may be expected as common MLS router and MLS payload label sets, other embodiments may use labels having different informational constituents that are known to that messaging network system but are not <GOV>.<ORG>.<IND> or <CLASS>.<METHOD>.<STDIN|OUT|ERR> as the invention does not specify what label types must be used or the number of label types that constitute a valid label. This feature provides a greatly expanded set of the types of information may be used and may provide a large degree of flexibility for evolution of the system as laws, regulations and corporate practices continue to change.

Messages sent from a source to a receiver successfully are aggregated in the receiver router's receiver exchange module 175. There, label constituents and associated policy labels may be inspected to confirm that the receiving government or organization facility is authorized to receive the payload. For example the message from "US.ABC1234MHOSP.NKEANMD" that apparently includes a patient record as the payload "PRECORD.TRANSFER.STDOUT." As the receiver may be another hospital in the US, "US.WXYZ54321MHOSP.*" 175*a* which may be programmatically implemented on a physical node on-the-fly so most likely has all processes for the receipt of HIPAA governed materials already in place, the message is expected to be received and placed in a client upstream payload exchange module where the ability of the receiving individual, Dr. Jo Wilson, may be confirmed using the payload label 185*a* before being placed in a client federated payload exchange module 190 for the recipient, J. Wilson, MD. under the handling requirements for the materials listed in the payload label 190*a*. In cases where a single message arrives with more than one recipient, the entire message may be duplicated such that each recipient gets an autonomous copy of the message which may be modified or tracked per programmed rules of the embodiment.

Laws, regulations and both corporate and network service policies may change significantly over time. Embodiments of the regulatory label-aware message routing system provides the ability to write routing rules using a plurality of programming languages and may have extension libraries for at least a subset of those languages to allow for the precise and efficient codification of message handling actions such that all nuances of these important, potentially complex directives may be accurately represented. Programming of route or policy directives may be accomplished remotely 145 in most embodiments using programming interface clients specific for either route rule command entry 120 or route policy command entry 130. Certain aspects may use only direct MLS programming client connections for route rule programming changes, policy rule programming changes or both to maintain a higher level of security. MLS route rule programming is normalized in an MLS route writing module 125 and, upon confirmation of the authority of the programming author by the MLS route writing module may be committed to an append-only MLS rules write-ahead data store 140 for persistent storage. Similarly, MLS policy rule programming is normalized in an MLS policy writing module 135 and, upon confirmation that the author of the new programming is authorized to add rule code to the routing system, committed to the append-only MLS rules write ahead data store 140 for persistent storage.

For maximal forensic analysis opportunity and change tracking capabilities, embodiments of the write ahead log 140, which hold the current, working, set of both routing and policy rules as well as records of all previous rules may incorporate a distributed ledger. One distributed ledger mechanism that may be used are available blockchains such as BITCOIN™, FACTOM™, LBRY™ and BIGCHAINDB™ among others where any modification of previous entries once committed is extremely difficult, if not impossible. While these blockchain services currently suffer from low data storage ceilings and may require purchase of cryptocurrency per unit storage, this drawback may be overcome by embodiments by combining secured, conventional database storage to store the full rule programming information while using one of the blockchain services to store hash recorded information to serve as the ledger. Another mechanism for secure, persistent write ahead log change tracking that may be used by embodiments is to control the change of route and policy rule programming through smart contracts or some other, similar vehicle known to those skilled in the art.

Translation of the current router and policy rules of the write ahead log 140 into the router 160, 170, 180 behavior of the embodiment may be performed by the MLS route module 150 for router rules and the MLS policy module 155 for policy expressions. These modules may perform updates by destroying existing software-based routers and creating new routers compliant for the newest rule state or by updating the existing router or routers to reflect the current rule status based upon instantaneous embodiment conditions or implementation. This allows for the most efficient rule entry to rule implementation pathway based upon the specific needs of the embodiment.

As embodiments are designed to be a distributed service, each of the described features may individually take place on different physical servers possible residing in separate, distant, data centers.

Figure 2:
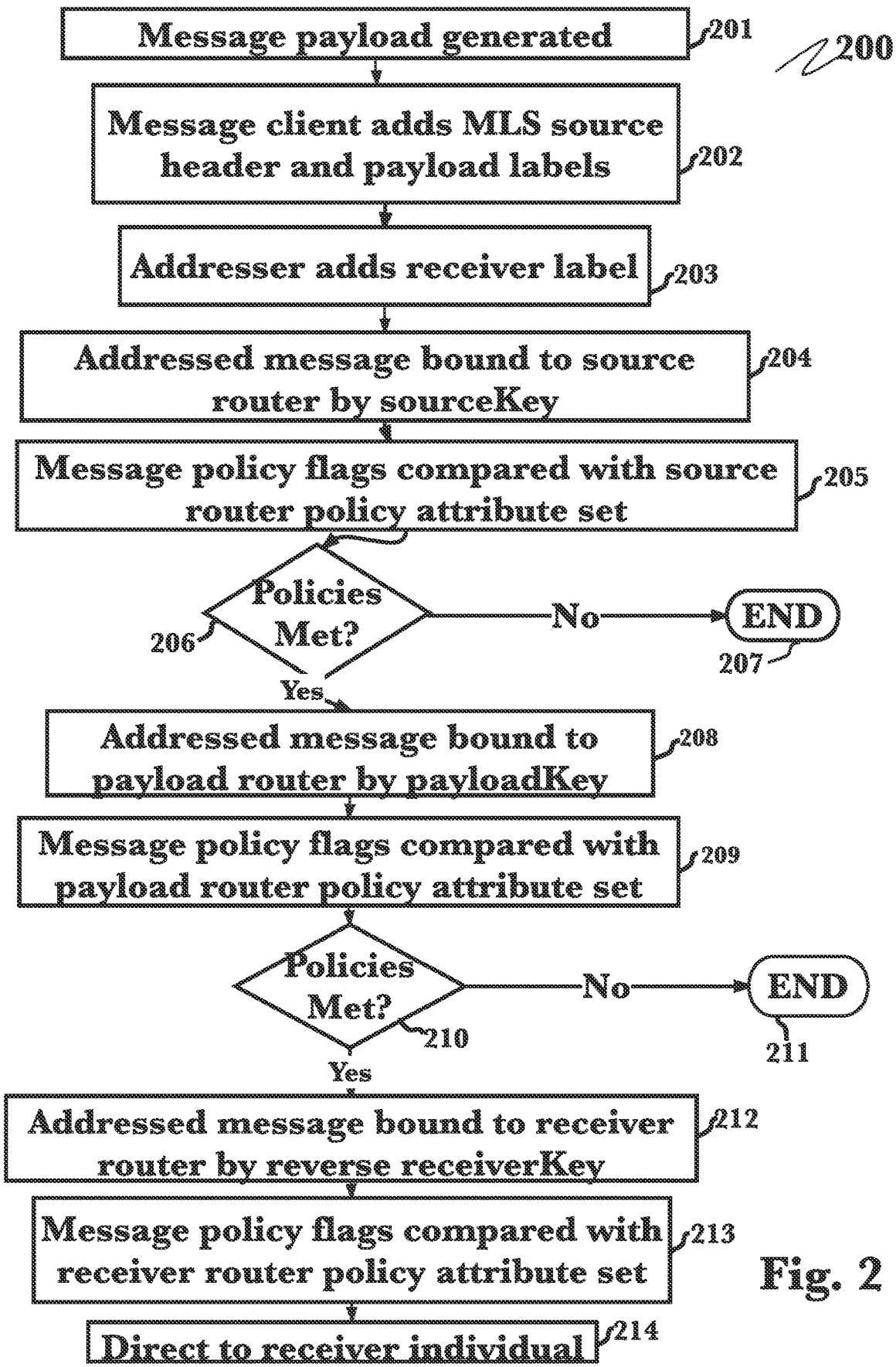
FIG. 2 is a flow diagram of an exemplary function of a regulatory message label-aware message routing system in routing sensitive electronic messages per an embodiment.

FIG. 2 is a flow diagram of an exemplary function of a regulatory message label-aware message routing system in routing sensitive electronic messages per an embodiment 200. The message payload is generated by the message client and may include data comprised of one or more of a plurality of both sensitive or regulated information parts which in turn may include but are not limited to personal identification information such as bank account numbers, personal identification numbers (ex. a social security number, driver license number, or similar such code known to those skilled in the art), national security and defense information, or intellectual property information, just to name a few examples of the focus of the function of the embodiment, and non-regulated portions 201. During the creation of the message, the author may also indicate the entity meant to receive the message. The message client may then create a header specifying the source of the message as well as the contents of its payload in the message's payload level (OSI layers 8/9/10 (see FIG. 3)) header, placing labels, also known as "keys" corresponding to <GOVERNMENT>, <ORGANIZATION>, and <INDVIDUAL> for the source router of the message and <CLASS>, <METHOD>, and <ORIGIN> describing the payload 202. Source router label information within the header and the payload description label information may then be used to address the message to a receiver router based upon the contents of the message header, the intended recipient and the current routing rules and policies stored within the embodiment 203. It is possible that the combination of the message header's source router and payload keys and the current embodiment's router rules and policies, no acceptable receiver router will be generated as the message may not be sent to the intended recipient. Under this condition when the message is bound to the source router by the header's sourceKey 204, this routing rule failure or some other routing rule or policy failure later determined 205 may lead 206 to the message not being sent 207 in which case the message client (FIG. 1, 105) may be informed. The nature and restrictions upon the payload of the message may also be determined based upon the embodiment's message client generated payload label designations 209 after the message is aggregated upon passing through the source router and bound to the payload router 208. Again, failure to comply with routing rules and policies based on payload contents may lead 210 to a failure of the message to progress to the intended recipient 211 for security, secrecy, or statutory restrictions, just to name a few examples of delivery failure categories familiar to those skilled in the art and handled by embodiments. Upon successful inspection of the payload key with all rules and policies fulfilled, the message may be sent to the recipient. This may be done by first sending the message to a receiving router for the organization, ignoring the receiving individual and may take multiple transitions between connected routing appliances (hops) to accomplish. These hops are pre-specified by embodiments with the header receiver label first pointing to the first intermediate hop router, which upon reaching the first intermediate hop router is stripped from the header and replaced by the label for the second intermediate hop router and so on, the process of substituting the receiving router label repeating until the ultimate destination router is reached. The path or router hops taken may be affected by other policy or router rules such as but not limited to restrictions on geographical zone or region or information protection protocols present, that each router must fulfill, for example "US", "defense department controlled" or "HIPAA safeguards in place" to name just a few illustrative possibilities, the message may be restricted only to MLS routers in the US, restricted only to MLS routers controlled by the military, or only MLS routers running specific information handling or protection protocols, HIPAA protections, in the example. Upon reaching the originally designated receiving MLS router 212, often serving the organization to which the receiving individual belongs 213, the MLS header including all labels may be stripped the message forwarded, provided that individual is determined to be authorized to handle the sent information 212, using lookup for the recipient individual, the message is delivered using classic OSI layer 3 routing and layer 2 switching 214.

Certain embodiments may routinely encrypt the payload or handle payloads with task specific encoding such as but not limited to structured threat information expression (STIX), trusted automated exchange of indicator information (TAXII), and cyber observables (CybOX), among other similar offerings known to those skilled in the art.

FIG. 3A is a diagram showing layers often called the "media layers" of an exemplary representation of the ten-layer OSI model. The OSI stack has long served as a model of the abstract layers that make up a network system 301 from computing device application at layer seven through the physical media that may carry the encoded impulses at layer 1 each with a specific attributed function 302. Looking at FIG. 3A, layers 1, 2, and 3, often called the "media layers" 310, comprise the 1. The physical layer 311*a* which is made up of the hardware, such as network cards, patch cables and repeaters that generates, carries and receives the information containing impulses 311*b;* 2. The data link layer 312*a* which represents the low level protocols such as Ethernet and token ring, just to name two, to ensure reliable transmission of data between two endpoints connected by physical layer devices, switches are placed at this layer 312*b*; and 3. The network layer 313*a* which manages network traffic between multiple network nodes including message packet routing and traffic control protocols, routers are placed at this layer 313*b*. FIG. 3B is a diagram showing layers often called the "host layers" of an exemplary representation of the ten-layer OSI model. Looking at FIG. 3B, the next 4 layers together may be designated the "host layers 320" and comprise: Layer 4, the transport layer 321*a* which includes the protocols, such as UDP and TCP that promote reliable transmission of data segments or datagrams between points on a network including connection initiation, segment acknowledgement, and re-transmit management 321*b*; Layer 5, the session layer 322*a* provides management of communication sessions in the form of back and forth transmission of information between two nodes on a network 322*b*; Layer 6 the presentation layer 323*a*, which manages form changes such as network level encryption/decryption, and compression/decompression of data 323*b*; and Layer 7, the application layer 324*a* which comprise the APIs allowing an operating system level process to exchange data with OSI layers below it 324*b*. Some of these layers place informational headers pertaining to their activities onto the core payload data which travels over the network with the payload data packets and are removed as the transmission is delivered at the destination.

Recently, the need to safeguard message payload data has risen to the point that network bound messages must be carefully tracked to fulfill regulations that arise at an organizational level such as but not limited to corporate practices, and policies, merchant customer data safeguarding concerns, and regional or global computer infrastructure maintenance, and incorruptible reporting of such. Governments including but not limited to the US and the European Union have passed laws aimed at protecting personal information and promoting such by stipulating significant penalties on those, corporate or otherwise, who do not adequately adhere to best practices or published minimums, a health care related example of this in the US being Health Insurance Portability and Accountability Act (HIPAA). This organizational and government attention as well as the recent legal atmosphere pertaining to security breaches of private information has solidified the need to strictly control the flow of network messages based upon payload rather than destination location. FIG. 3C is a diagram showing layers often called the "payload layers" of an exemplary representation of the ten-layer OSI model. Looking at FIG. 3C this new requirement has resulted in the addition of three additional, top level layers to the OSI model, designated here as "Payload Layers 330" which comprises Layer 8, an individual layer 331*a*, which manages parameters within a payload description pertaining to the individual sending a network transmission containing the payload and an individual receiving that network transmission 331*b*. Layer 9, an organization layer 332*a*, which manages parameters in a payload description that pertains to the sending organization and the receiving organization including authorization to the payload contents and rules and policies of both organizations that may modify network message transmission, including pathway and delivery 332*b*. Finally, Layer 10, a "government layer" 333*a* allows description of rules and policies that may relate to geographical or network topology defined "availability zones" for where specific information may be transmitted and what safeguards must accompany the payload information 333*b*.

Figure 4:
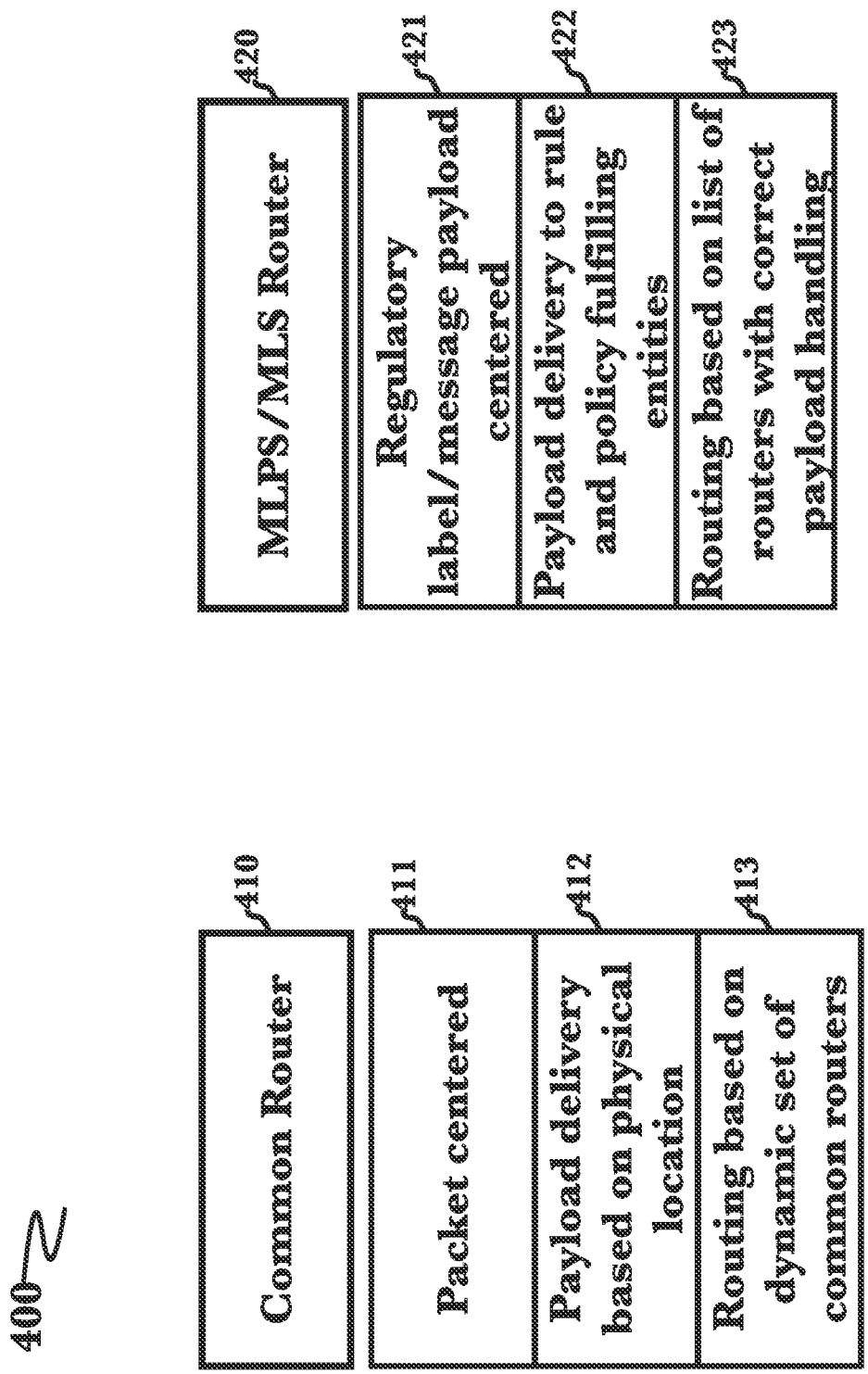
FIG. 4 is a comparison of select features of common routers and an embodiment router.

FIG. 4 is a comparison of select features of common routers and an embodiment router 400. To date, virtually all routers called to mind when discussing a computing device network 410 from a small wide area network to those that serve the internet, perform by reading the OSI layer 3 packet header 411 and determining to which of a plurality of known routers 413 to forward that packet using the destination IP address, or a suitable analog depending on the networking system in use, without regard to payload contents. Multiple improvements on this basic description have arisen, but the majority have been in response to speed and network segment congestion issues or aimed at more rudimentary security matters as preventing injection of malicious routers into the routing tables used to determine a next "hop" in a delivery path. For the most part current common routers retain their heritage of message openness with no payload security borne from a time when the need for such security was not at all foreseen. The focus of the common router is to forward a network packet from a source location to a destination location 412 optimizing speed and network congestion using a dynamic list of downstream routers which may span a limited number of hops in the total packet delivery path 413. This current routing system is not suited to the current information security climate where significant effort is made by a plurality of individuals, groups and even governments to misappropriate sensitive personal, business, and national data. Nor does it provide any mechanism to assure and confirm compliance with the plurality of regulations both at the organizational, such as but not limited to corporate, hospital, and banking; or government level issued to combat private information theft.

Embodiment MLS routers 420 may route messages through a network based upon the payload contents and any regulatory routing rules or policies associated with that payload and thus may be considered to work on OSI layers 8,9 and 10 that have been added to the OSI model to describe the activities of networking protocols and hardware that inspect message payload related restrictions, credentials or instructions pertaining to individuals (OSI layer 8), organizations (OSI layer 9) and governments (OSI layer 10) 421. Systems of this type are engineered to accept, under sets of stringent access rules, labels which may be in the form of a unique alphanumeric token defining specific entities such as individuals, organizations, countries, geographical regions or zones of identical message payload regulatory and policy requirements in addition to other like entities familiar to those skilled in the art, which may be further grouped based on like payload handling authorizations (For example all health care professionals at a hospital who have up-to-date HIPAA privacy training credentials may all have the ability to receive network message payloads marked with a label designating the payload "HIPAA regulated," provided the hospital is also HIPAA accredited, or all military personnel with certain clearances and affiliation to a specific project may have the ability to receive network messages with the label "SECR!! 12538," possibly also assuming that the individual is attempting to access the information in an "availability zone", geographical, or otherwise, where viewing is allowed 422. In addition to what may be considered "credentialing functions" of individuals, organizations and availability zones, embodiments also comprise an extensive body of programming at least some of which attaches identifying labels for entities, groups of entities, and payload information regulations and policies to specific actions and effects of those regulations and policies to, for example, programmatically ensure that a message payload marked with the label such as "EU" is only routed through European Union compliant routers 423. As embodiments are highly distributed, many vetted operators at multiple embodiment served locations may be involved in entering both credential type and programming data.

FIG. 5, divided into FIGS. 5A and 5B are process diagrams of a simplified OSI 8/9/10 message header and example programming structure per an embodiment 500. FIG. 5A: Given a network with a simplified embodiment OSI layer 8/9/10 type header 510 presented here, we have a message being sent by N. Kean, MD 515*d* at ABC1234 Memorial Hospital 515*c* which is in the United States 515*b* (US.ABC1234MHOSP.NKEANMD) as indicated by the sourceKey 515*a*. The message payload is a patient's record 520*b*, the action is categorized as a transfer 520*c* and the initiator may be a workstation: STDOUT 520*d* as is indicated by the messages payloadKey (PRECORD.TRANSFER.STDOUT) 520*a*. The message and is payload is being sent to another doctor J. Wilson, MD and a remote embodiment served hospital WXYZ4321 Memorial Hospital which is also in the United States as is indicated by the receiverKey 525*a* in the message's header: (US.WXYZ4321MHOSP.JWILSONMD) 525*b*, 525*c*, 525*d*. Other labels relevant to the message payload are also included header as activePolicies 530*a*, these include the label indicating the payload is subject to HIPAA law stipulations "HIPAA" 530*b*, that the message and its payload will be entirely routed by US based routers "US" 530*c* and that the system will internally encrypt the message during routing 530*d*. Some of these labels may not be dictated by the payload but present due to embodiment defined best practices. It should be noted that the header is devised to best illustrate some of the important features of the embodiment and may not be found in a single header or, in some cases, any header generated by a preferred embodiment.

Given the sample MLS compliant message header, one may illustrate some of the function archetypes for select modules of an embodiment. From the messaging client and from information included by the author of the network message, including the nature of the source router key 515*b-d* and payload key 520*b-d* specified by the messaging client, to be sent as well as embodiment internal programming, the MLS addresser module (see FIG. 1, 110) 550 may add the label for the receiving router: .addReceiverKeyo and then sends the message. The source router exchange 115, 551 may perform several pre-programmed tests and then binds the message to the source router 160, 552 which may be implemented (.of("US.ABC1234MHOSP.*")) and configured (.if("patient-health-record")) on-the-fly in software in certain embodiments. The message may then be passed to a payload exchange module 165, 553 which may perform further payload specific tests and then bind the message to the appropriate payload router 170, 554, 555, As illustrated in FIG. 5B, 590, which again may be implemented (.of ("PRECORD.TRANSFER.STDOUT")) and configured (.if (policy.is("US")), .if(policy.is("HIPAA)) in software as the need for the router arises. Also illustrated is a modular feature of embodiments which allows programming for payloads with complex regulatory and policy specifications to be assembled from multiple rules 554, 555 simplifying maintenance of individual regulation or policy driven programs and the troubleshooting of non-functional modules. Programming of receiver exchange module 175, 556 and implementation as well as configuration of the receiver router 180, 557 follow the previously shown standard with ultimate delivery depending upon the credential labels of the receiving individual matching the required regulatory minimums of the payload (.if(receiveind.is.policyTrusted(JWILSONMD)). Dependent on the embodiment, policy testing for the ultimate receiving entity may be performed in the upstream payload exchange module (FIG. 1, 185).

It should be understood that the skeletal programming snippets shown in this figure represent the minimal amount of archetype code needed to introduce each salient point and are not at all reflective of the programming complexity or function diversity expected to be present in a functional embodiment.

Figure 6:
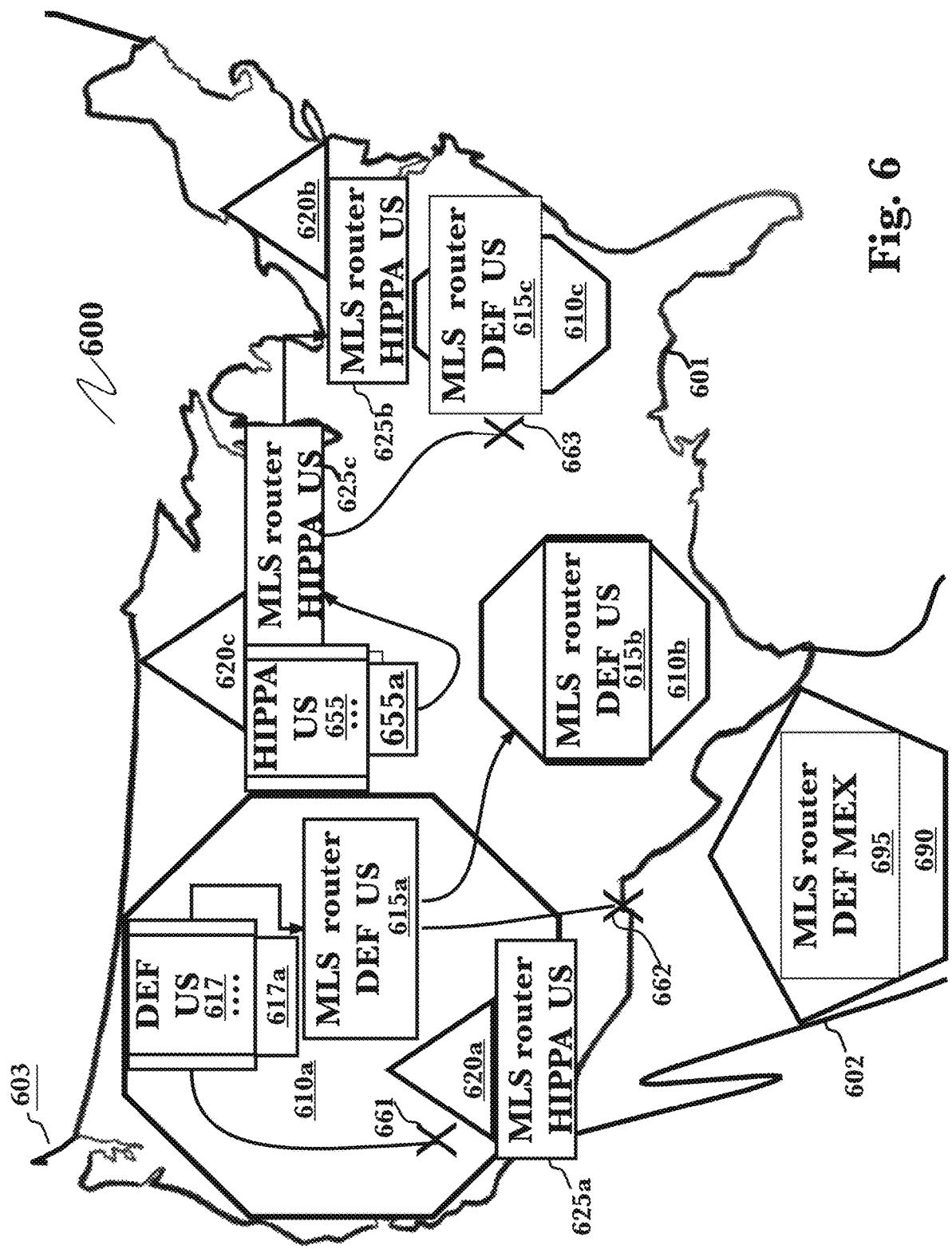
FIG. 6 is a diagram illustrating the use of routing regulatory labels to create availability zones

FIG. 6 is a diagram illustrating the use of routing regulatory labels to create availability zones 600. One way of characterizing the areas where message payloads governed by equivalent regulations and policies is through the construct of availability zones. Availability zones may be a large geographical region such as a country, for example the United States 601, Mexico 602 and Canada 603 just to list three of the plurality known to those skilled in the art. Other availability zones may result from the presence of a specific organization such as but in no way limited to military installations 610*a*, 610*b*, 610*c* and 690 which may possess the ability to process defense regulated messages 615*a*, 615*b*, 615*c* or health care facilities 620*a*, 620*b*, 620*c* which may occupy geography as small as a single building and be equipped to process HIPAA regulated messages 625*a*, 625*b*, 625*c*. Based upon these availability zones and MLS actionable labels, messages may be tightly controlled for transmission and delivery. A USA (US) defense (DEF) regulated and labeled message 617 with an MLS header 617*a* may thus be sent to USA military installations such as but not limited to bases and buildings 610*a-c* over MLS service routers 615*a*, 615*b*, 615*c*. When employed sensitive US defense (DEF) messages 617 may be successfully sent from the source router 615*a* to one or more destination receiver routers 615*b* and 615*c* within other US DEF availability zones 610*b*, 610*c*. Messages with US and DEF labels, signifying they are regulated by rules for US and DEF will not be sent 662 to a DEF availability zone for Mexico (DEF MEX) 690 as the MLS router 695 has only the credentials imparted by "DEF." The same message will not be sent 661 to a US HIPPAA compliant availability zone 620*a* as the HIPAA MLS router in the zone lacks DEF authorization. Similarly, a health care message payload 655 with a MLS compliant header 655*a* will be successfully sent by a HIPAA compliant MLS source router 625*c* to a HIPAA compliant MLS router 625*b* at a second HIPAA credentialed availability zone 620*b* but not to a US DEF authorized availability zone 610*c* which lacks HIPAA data handling protocols 663. Embodiments may route messages through compliant MLS router exclusive paths 615*a* to 615*b* to 615*c* when intermediate hops are required. Failed message transmission attempts 661, 662, 663 would fail prior to transmission out of the source availability zones. Partial paths in those samples were solely to illustrate the intended, failing target.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 7:
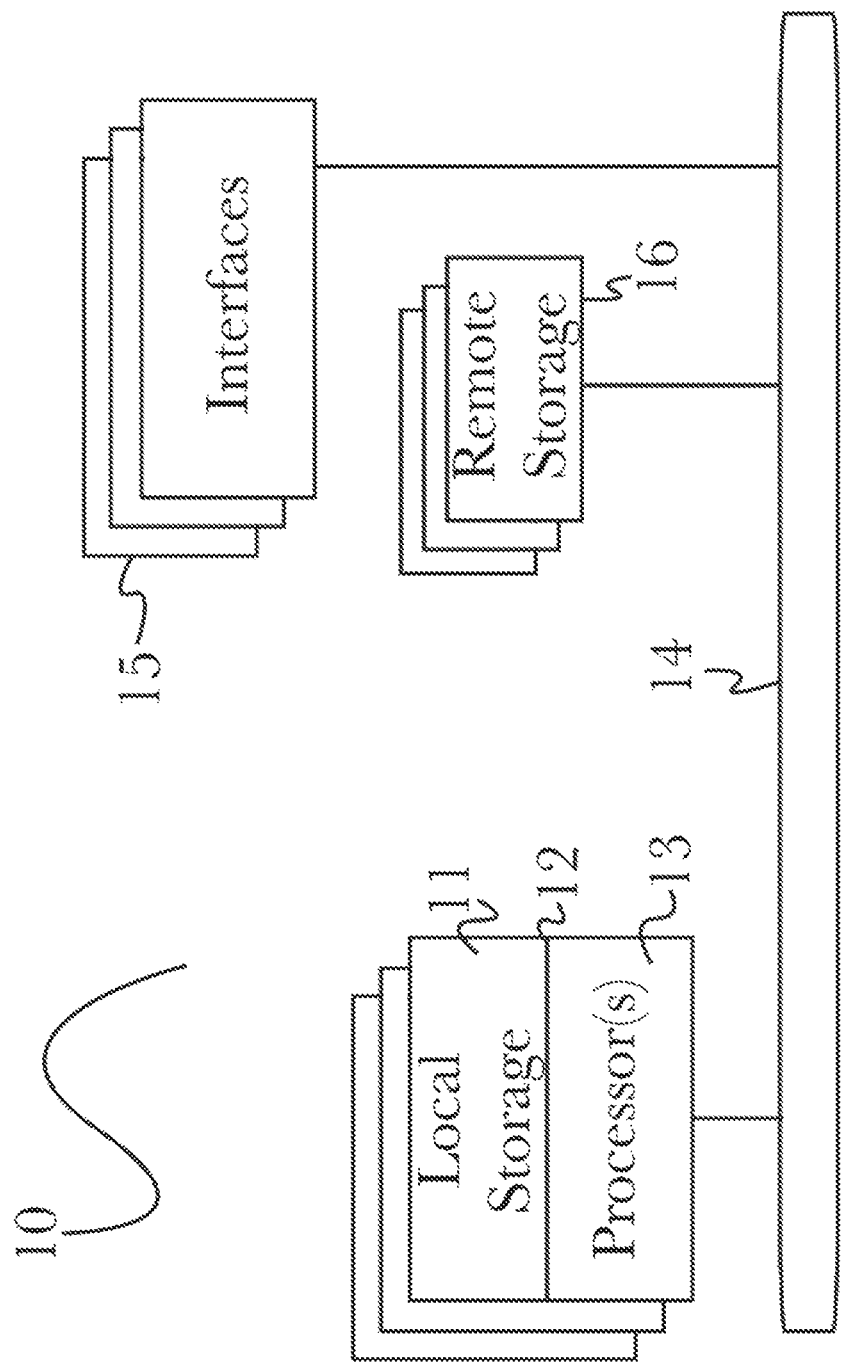
FIG. 7 is a block diagram illustrating an exemplary hardware architecture of a computing device used in various embodiments of the invention.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
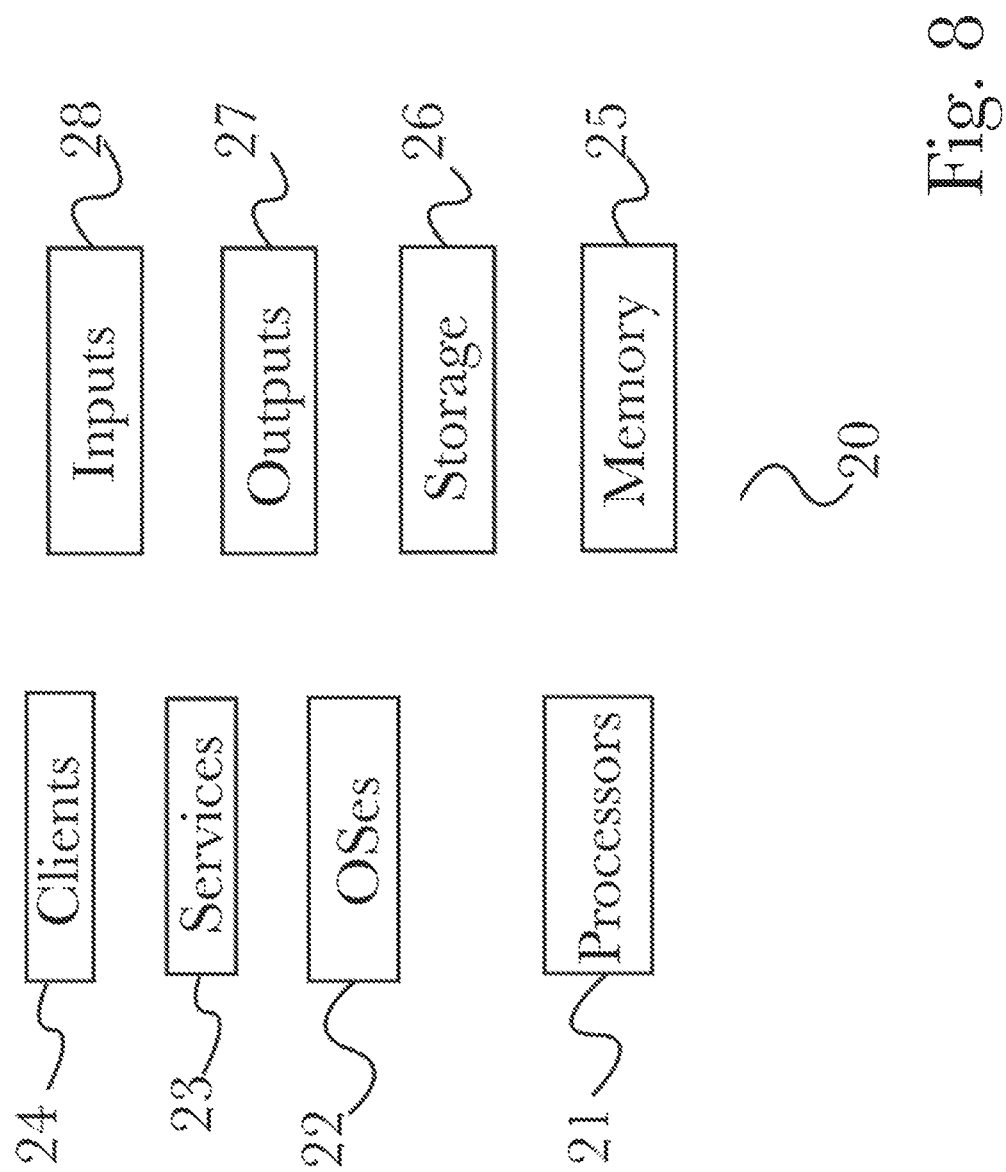
FIG. 8 is a block diagram illustrating an exemplary logical architecture for a client device, according to various embodiments.

In some embodiments, systems according to the present invention may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 9:
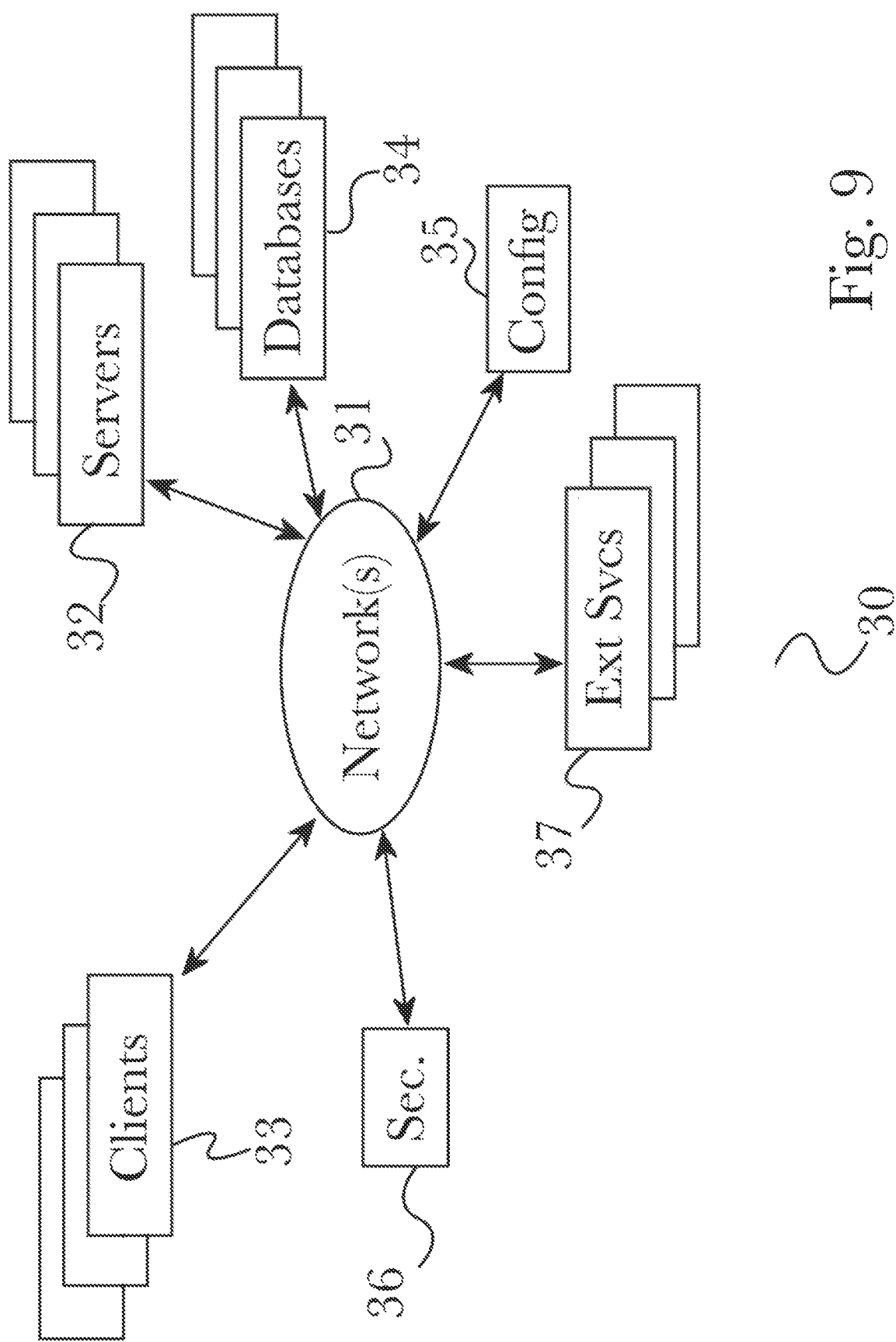
FIG. 9 is a block diagram illustrating an exemplary architectural arrangement of clients, servers, and external services, according to various embodiments.

In some embodiments, systems of the present invention may be implemented on a distributed computing network, such as one having any number of clients and/or servers. Referring now to FIG. 9, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 10:
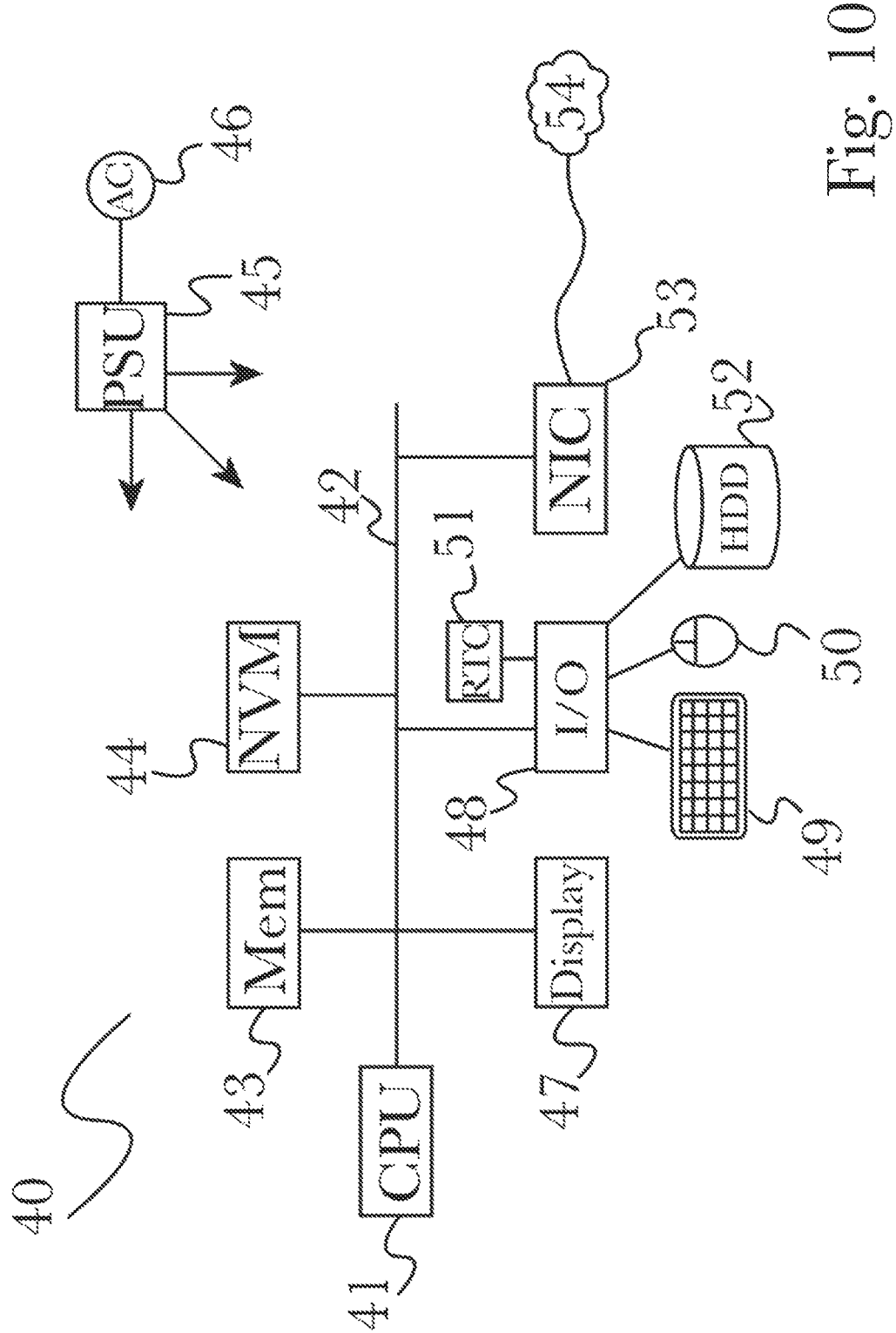
FIG. 10 is another block diagram illustrating an exemplary hardware architecture of a computing device used in various embodiments.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for regulation-based electronic message routing using an expanded open system interconnection ("OSI") model comprising:
a plurality of computing devices each comprising at least a processor, a memory, and a network interface;
wherein a plurality of programming instructions stored in one or more of the memories and operating on one or more of the processors of the plurality of computing devices causes the plurality of computing devices to:
retrieve a plurality of information regulations and information policy rules comprising three additional layers beyond the standard seven-layer OSI model from a regulated data store;
receive an electronic message comprising a message payload, the message payload configured to utilize the expanded OSI model;
determine that the electronic message comprises information in one of the three additional layers that satisfies an information policy rule;
generate a message route for the electronic message using a handling policy rule generator, based on a respective information regulation and information policy rule; and
route the electronic message to a first router of the message route;
wherein the route comprises a path of router hops compliant with the information regulation and information policy rules.

2. The system of claim 1, wherein the regulated data store includes a ledger feature to immutably record changes made to the regulated data store.

3. The system of claim 1, wherein at least a plurality of the information regulations is issued by at least one government entity from at least one geographical region.

4. The system of claim 1, wherein at least a plurality of the information policies is issued by at least one organization from at least one geographical region.

5. The system of claim 1, wherein layers one through seven of the expanded OSI model are the layers of the standard seven-layer OSI model and wherein:
one of the three additional layers comprises attributes relating to individuals;
one of the three additional layers comprises organizational directives; and
one of the three additional layers comprises political and geographical boundaries.

6. A method for electronic message routing using an expanded open system interconnection ("OSI") model comprising the steps of:
retrieving a plurality of information regulations and information policy rules comprising three additional layers beyond the standard seven-layer OSI model from a regulated data store;
receiving an electronic message comprising a message payload, the message payload configured to utilize the expanded OSI model;
determining that the electronic message comprises information in one of the three additional layers that satisfies an information policy rule;
generating a message route for the electronic message using a handling policy rule generator, based on a respective information regulation and information policy rule; and
routing the electronic message to a first router of the message route.

7. The system of claim 6, wherein the regulated data store includes a ledger feature to immutably record changes made to the regulated data store.

8. The system of claim 6, wherein at least a plurality of the information regulations is issued by at least one government entity from at least one geographical region.

9. The system of claim 6, wherein at least a plurality of the information policies is issued by at least one organization from at least one geographical region.

10. The system of claim 6, wherein layers one through seven of the expanded OSI model are the layers of the standard seven-layer OSI model and wherein:
- one of the three additional layers comprises attributes relating to individuals;
- one of the three additional layers comprises organizational directives; and
- one of the three additional layers comprises political and geographical boundaries.

11. One or more non-transitory computer-storage media having computer-executable instructions embodied thereon that, when executed by one or more processors of a computing system employing a similarity subsystem, cause the computing system to perform the method of claim 6.

* * * * *